Aug. 25, 1964     L. D. NINNEMAN     3,146,282
METHOD AND APPARATUS FOR INJECTION MOLDING
OF PLASTIC MATERIALS
Filed April 17, 1961

INVENTOR
Lawrence D. Ninneman

BY W. A. Schaich & Charles S. Lynch
ATTORNEYS

United States Patent Office 3,146,282
Patented Aug. 25, 1964

3,146,282
METHOD AND APPARATUS FOR INJECTION
MOLDING OF PLASTIC MATERIALS
Lawrence D. Ninneman, Toledo, Ohio, assignor to Owens-Illinois Glass Company, a corporation of Ohio
Filed Apr. 17, 1961, Ser. No. 103,654
5 Claims. (Cl. 264—39)

This invention relates to an improvement in a method and apparatus for making of plastic articles by injection molding.

According to one type of injection molding apparatus a rotary plastic valve has been used to alternately close and open the feed channel leading from the feed hole of the extruder, the source of the plastic to be ultimately molded, into the bore of the sleeve within which a ram operates and picks up the plastic and thereafter expels it into a mold cavity of the desired configuration. Since this valve is located about twelve inches from the point of admission of the plastic into the bore of the sleeve, the pressure that was built up during the discharge of the plastic into the bore of the sleeve and after the valve has been closed resulted in an accumulation of plastic behind the tip of the ram after it has moved to its furthest position forward. The method and apparatus of the present invention solves the aforementioned problem by preventing the accumulation of plastic behind the ram tip which tends to interfere with the efficient operation of the injection molding apparatus by binding the free movement of the ram within the sleeve bore.

It is, therefore, an object of this invention to provide a novel method and apparatus which will prevent the binding of the ram by excess plastic in an injection molding apparatus.

A further object of this invention is to provide a novel method and apparatus for preventing the accumulation of plastic behind the ram tip, which results in the binding thereof, in injection molding apparatus.

These and other objects will be apparent from the description which follows.

In accordance with the present invention a novel spool valve arrangement is employed in the feed channel connecting the source of plastic molding material with the bore of the sleeve within which the ram operates whereby the plastic is prevented from binding the ram. By the use of the aforementioned apparatus a novel method of injection molding can be effected.

Other objects and advantages of the foregoing invention will become more apparent from the following detailed description taken in conjunction with the accompanying drawing in which.

Figure 3:
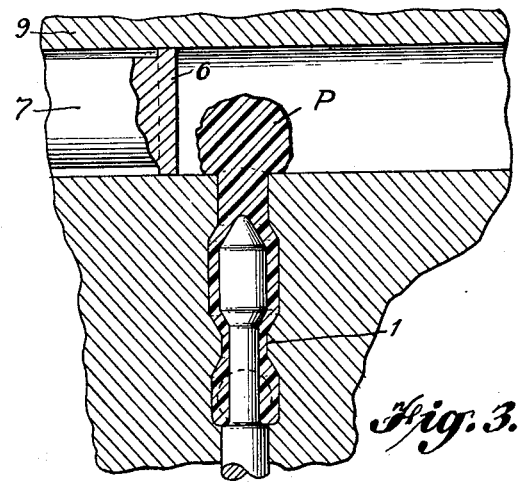
FIG. 3 is a view similar to FIG. 1 showing the introduction of plastic.
Figure 4:
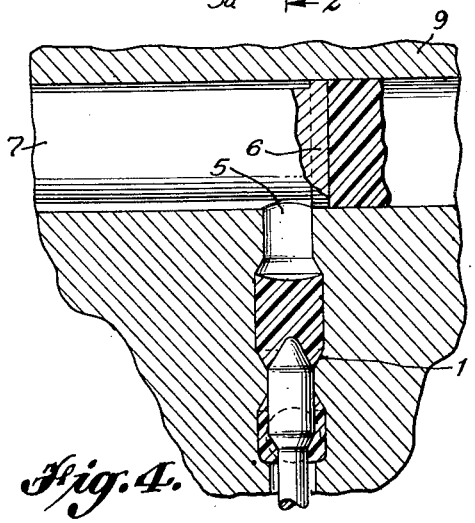
FIG. 4 is a view similar to FIG. 1 showing the ram moving forward and advancing the plastic toward a connecting mold cavity (not shown) while the spool valve is in a closed position.
Figure 5:
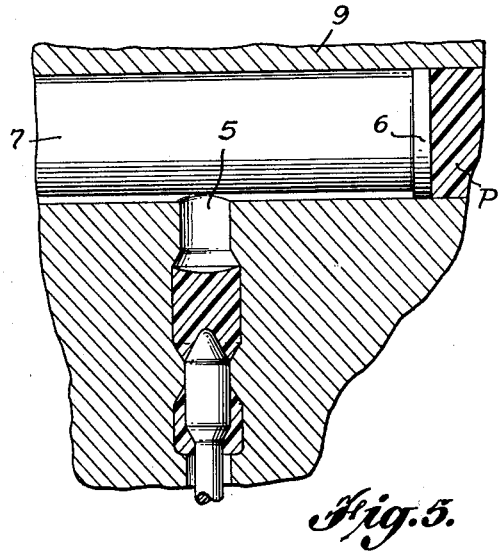
FIG. 5 is similar to FIG. 4 except the ram is shown in a more forward or advanced position.

Referring to the drawings there is shown that part of an injection molding apparatus comprising a feed channel 1 having an upper chamber 1b, a lower chamber 1a and a throat or restriction 1c. Channel 1 connects feed opening 8 of duct 10 (FIG. 2) from a plastic extruder (not shown) with bore or injection channel 4 of feed sleeve 9. Spool valve 3 is shown in open position in FIG. 1, and a measured charge of plastic P is forced through opening 8 into channel 1 and ultimately into bore 4 via feed hole 5. The ram 7 with tip 6 is then moved forward as in FIG. 3. When the ram reaches the position shown in FIG. 4, the spool valve 3 with its shaft 3a, spindle 3b, and elongate head 3c is pulled down thereby blocking the throat 1c of channel 1 and also increasing the volume of chamber 1b to suck or withdraw the plastic P remaining in chamber 1b downward and away from bore 4 thereby avoiding any accumulation of plastic behind the ram tip 6 which would cause it to bind. FIG. 5 shows a later stage in the molding process in which the plastic P has been advanced by the ram tip 6 to a point where the plastic is about to enter the mold cavity (not shown) wherein the plastic articles are given final shape and form. The ram 7 is then returned to the position shown in FIG. 1. Spool valve 3 is thereafter moved upward as shown in FIG. 1 and the molding cycle is then repeated.

From the foregoing description it will be apparent that there has been devised a novel molding apparatus in which a spool valve 3 is employed that effects a two-fold purpose. First, the spool valve 3 serves to act as a valve by blocking off the flow of plastic P at throat 1c between chamber 1a to chamber 1b which will retain the pressurized plastic P in the feed channel 1. Second, as spool valve 3 is retracted downward, it will create a void or increase the volume in chamber 1b by an amount dependent upon the distance head 3c is pulled into restriction 1c, which will suck the plastic away from the hole 5 leading into bore 4 and consequently prevent the plastic from building up and accumulating behind the ram tip 6 which would interfere with the efficient operation of the molding apparatus.

Figure 1:
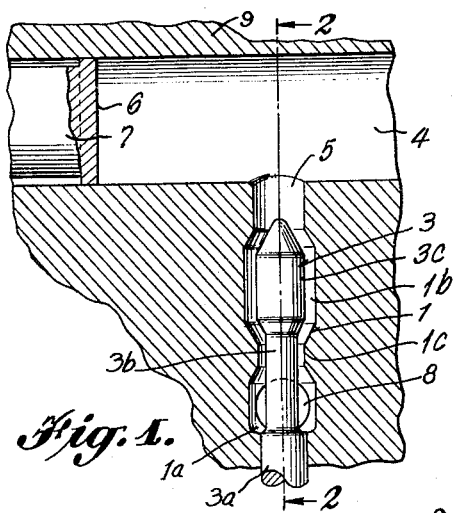
FIG. 1 is a fragmentary view partly in section of a molding apparatus showing the novel spool valve arrangement employed.
Figure 2:
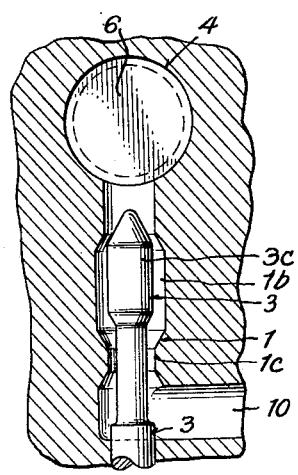
FIG. 2 is a view partly in section along line 2—2 of FIG. 1.

The particular construction of spool valve 3 and the manner in which it cooperates with the throat 1c of channel 1 has certain other advantages over the well known rotary valve used in the plastic molding art and as shown by U.S. 2,914,799 (rotary valve 10b in FIG. 3) and U.S. 2,331,702 (rotary valve 24 in FIG. 1). For example, when a rotary valve such as those referred to above, is in closed position, the incoming plastic exerts a strong lateral pressure against the rotary valve so as to make the turning of the valve not only more difficult but also to cause a greater wear of the valve during the turning or use thereof. However, with the spool valve 3 construction of the present invention, the valve is centrally positioned by throat 1c thereby insuring that the plastic P being fed through opening 8 of duct 10 will be uniformly distributed around shaft 3a and not produce any excessive lateral pressure against valve 3, particularly opposite opening 8.

It will also be evident that the novel valve arrangement of the present invention is applicable in general to injection molding apparatus of the kind described. Moreover, a wide range of thermoplastic materials can be employed in the novel method and apparatus of the present invention. Means for operating or reciprocating ram 7 and valve 3 are not shown but to provide such means will be readily apparent to those familiar with the injection molding art. Ordinarily hydraulic means are employed to reciprocate ram 7 and similar means can also be used to reciprocate valve 3 in a vertical plane. Of course the movement of the ram must be synchronized with the movement of the spool as described above so as to insure a controlled flow of the plastic into the injection chamber thereby insuring that there will be no build up of plastic behind the ram tip so as to interfere with its efficient operation.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

I claim:

1. Apparatus for molding plastic materials comprising a duct for delivering a plastic charge, a channel connected to said duct and having a first and second chamber separated by a narrow throat area, a ram bore in turn connected to said channel, means for advancing the charge within said bore, and means capable of both lengthwise movement within said channel and of engagement with said throat area so as to simultaneously cut off the flow of plastic and suck back the plastic within said channel whereby the opening of the channel into the ram bore is free of plastic material.

2. Apparatus for molding plastic materials comprising a duct for delivering a plastic charge, a channel connected to said duct and having a first and second chamber separated by a narrow throat area, a ram bore in turn connected to said channel, means for advancing the charge within said bore, and means capable of both lengthwise movement within said channel and of engagement with said throat area so as to cut off the flow of plastic and suck back the plastic within said channel whereby the opening of the channel into the ram bore is free of plastic material.

3. A method of controlling the flow of plastic material into a ram bore from an intersecting feed passsage comprising the steps of feeding plastic material through said passage into the ram bore at a rate sufficient to completely fill the passage, advancing a ram through said bore past the intersection of the passage with the bore to separate the material in said bore from the material in said passage, blocking the passage at a location spaced from the intersection of the passage with the bore, and increasing the volume of the passage in a region between the point at which the passage is blocked and the ram bore to suck plastic material in said passage away from said ram bore toward the region of increased volume.

4. A method of controlling the flow of plastic material into a ram bore from an intersecting feed passage comprising the steps of locating a restriction in said passage at a point spaced from the intersection of said passage with said bore, locating an elongated member adapted to sealingly slide in said restriction within that portion of the passage between said restriction and said intersection, feeding plastic material through said restriction and said portion of said passage into the ram bore at a rate sufficient to completely fill said portion of said passage, advancing a ram through said bore past the intersection of the passage with the bore to separate the material in said bore from the material in said portion of said passage, advancing said elongated member into said restriction to block said passage, and continuing to advance said elongated member into said restriction in a direction away from said portion of said passage to thereby increase the volume of said portion of said passage to suck plastic material in said portion of said passage away from said ram bore.

5. In an apparatus for molding plastic materials having a ram bore adapted to receive a charge of plastic material, and means for advancing said charge of material through said bore; passage means intersecting said bore for feeding plastic material thereto, means defining a restriction in said passage at a location spaced from the intersection of the passage with said ram bore, and an elongate valve head normally located in that portion of said passage between said bore and said restriction and adapted to be slidably advanced longitudinally into said restriction to block said passage at said restriction and to increase the volume of said portion of said passage in accordance with the extent of longitudinal advancement of said valve head into said restriction.

References Cited in the file of this patent

UNITED STATES PATENTS

| 2,271,063 | De Mattia | Jan. 27, 1942 |
| 2,359,840 | Goessling | Oct. 10, 1944 |

FOREIGN PATENTS

| 609,799 | Canada | Nov. 29, 1960 |